(12) United States Patent
Tang

(10) Patent No.: US 9,685,104 B2
(45) Date of Patent: Jun. 20, 2017

(54) DISPLAY CONTROL APPARATUS AND RELATED METHOD

(71) Applicant: HON HAI PRECISION INDUSTRY CO., LTD., New Taipei (TW)

(72) Inventor: Pei-Chong Tang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/801,136

(22) Filed: Jul. 16, 2015

(65) Prior Publication Data

US 2016/0103647 A1    Apr. 14, 2016

(30) Foreign Application Priority Data

Oct. 10, 2014   (CN) .......................... 2014 1 0528253

(51) Int. Cl.
*G09G 3/00* (2006.01)
*G06F 3/14* (2006.01)

(52) U.S. Cl.
CPC ........... *G09G 3/003* (2013.01); *G06F 3/1438* (2013.01); *G09G 2356/00* (2013.01)

(58) Field of Classification Search
CPC .... G06F 3/1446; G06F 3/1423; G06F 3/1438; G06F 3/147; G09G 2356/00; G09G 2300/026; G06Q 30/0261; G09F 27/00; H04N 13/0278
See application file for complete search history.

(56) References Cited

U.S. PATENT DOCUMENTS

| | | | | |
|---|---|---|---|---|
| 2002/0197993 A1* | 12/2002 | Cho | ........................ | H04L 29/06 455/435.1 |
| 2004/0125044 A1* | 7/2004 | Suzuki | .................... | G06F 3/011 345/1.1 |
| 2007/0236489 A1* | 10/2007 | Jung | ........................ | G06T 11/60 345/418 |
| 2010/0053164 A1* | 3/2010 | Imai | ........................ | G06F 3/011 345/427 |
| 2015/0254045 A1* | 9/2015 | Drake | ................... | G06F 3/1446 345/1.3 |

* cited by examiner

*Primary Examiner* — Koosha Sharifi-Tafreshi
(74) *Attorney, Agent, or Firm* — Steven Reiss

(57) ABSTRACT

An independent display control apparatus communicates with a plurality of display devices. The display control apparatus includes a receiving module, a signal generating module, and a signal transmitting module. The receiving module receives the location information of a plurality of display devices and the signal generating module generates control signals based on the received locations, different locations can thus receive different control signals. Each of the control signals corresponds to a different segment of a predetermined media file transmitted to each display device and the group of display devices can thus be made to simulate the flight and bursting of a firework, or simulate the echoing of a single sound for example.

4 Claims, 4 Drawing Sheets

DISPLAY CONTROL APPARATUS AND RELATED METHOD

CROSS-REFERENCE TO RELATED APPLICATIONS

This application claims priority to Chinese Patent Application No. 201410528253.6 filed on Oct. 10, 2014, the contents of which are incorporated by reference herein.

FIELD

The subject matter herein generally relates to a display control apparatus.

BACKGROUND

A remote server communicates with a plurality of display devices. The remote server generates a common control signal and transmits a common operation to the display devices respectively.

BRIEF DESCRIPTION OF THE FIGURES

Implementations of the present technology will now be described, by way of example only, with reference to the attached figures.

DETAILED DESCRIPTION

Figure 1:
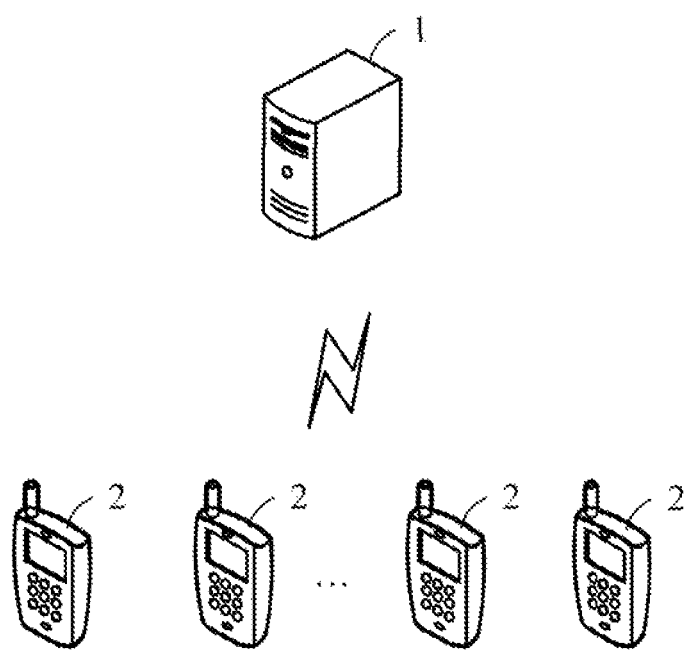
FIG. 1 is a diagrammatic view of an embodiment of a display control apparatus, the display control apparatus communicating with a plurality of display devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

Figure 2:
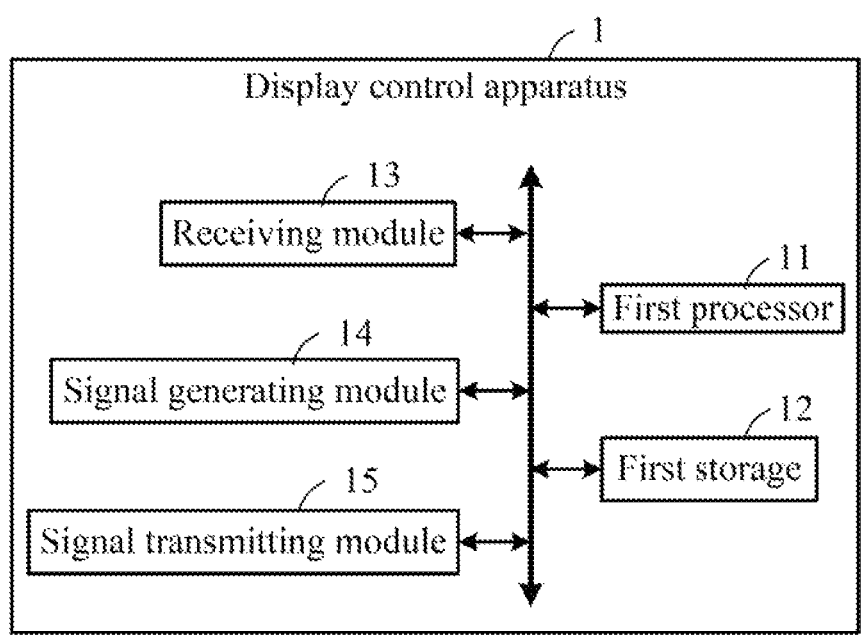
FIG. 2 is a block diagram of an embodiment of the display control apparatus of FIG. 1.

FIGS. 1 and 2 illustrate an embodiment of a display control apparatus 1. The display control apparatus 1 communicates with a plurality of display devices 2. Each display device 2 receives control signals transmitted by the display control apparatus 1. In at least one embodiment, the display control apparatus 1 can be a remote server. The display device 2 can be a mobile phone or a tablet. In other embodiments, the display control apparatus 1 is an independent apparatus located in a remote server.

The display control apparatus 1 includes a first processor 11, a first storage device 12, a receiving module 13, a signal generating module 14, and a signal transmitting module 15.

The first processor 11 executes one or more computerized codes and other applications of the display control apparatus 1 to provide functions of the display control apparatus 1.

The first storage device 12 stores a predetermined media file. The predetermined media file includes a plurality of segments. The first storage device 12 can be an internal storage device, such as a random access memory (RAM) for temporary storage of information, and/or a read only memory (ROM) for permanent storage of information. The first storage device 12 can also be an external storage device, such as an external hard disk, a storage card, or a data storage medium. In at least one embodiment, the predetermined media file can be an image file, an video file, or an audio file. The segment can be a region of an image file, at least one frame of the video file, or a passage of music within the audio file.

The receiving module 13 receives location information each of the display devices 2. In at least one embodiment, the location information is given as a global positioning system (GPS) information. In other embodiments, the location information can be a theater seating number.

The signal generating module 14 generates different control signals based on the locations each of the display devices 2. The control signals are related to different segments in the predetermined media file based on the location information transmitted by the display device 2. In other embodiments, the control signals are related to different predetermined media files respectively.

The signal transmitting module 15 transmits the predetermined media file or part and a control signal as a combination to the display devices 2 for controlling each of the display devices 2 to execute a predetermined operation. Each combination requires the execution of a different operation, the difference in operations being dependent on the location of each display device 2.

Figure 3:
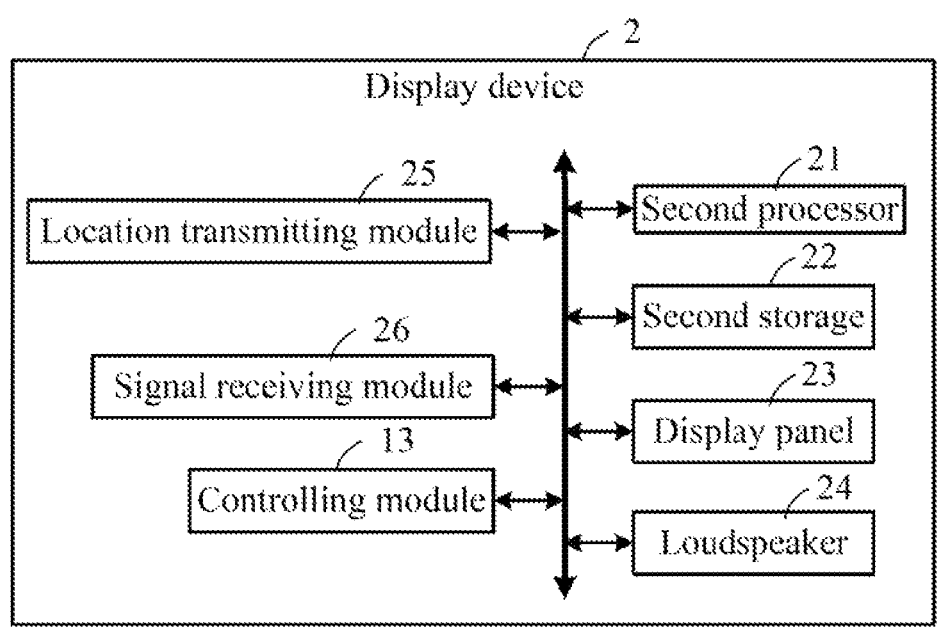
FIG. 3 is a block diagram of an embodiment of the display device of FIG. 1.

FIG. 3 illustrates the display device 2 of the embodiment. The display device 2 includes a second processor 21, a second storage device 22, a display panel 23, a loudspeaker 24, a location transmitting module 25, a signal receiving module 26, and a controlling module 27.

The second processor 21 executes one or more computerized codes and other applications of the display device 2 to provide functions of the display device 2.

The second storage device 22 stores the transmitted predetermined media file. The second storage device 22 can be an internal storage device, such as a random access memory (RAM) for temporary storage of information, and/or a read only memory (ROM) for permanent storage of information. The second storage device 22 can also be an external storage device, such as an external hard disk, a storage card, or a data storage medium.

The display panel 23 displays images. The loudspeaker 24 outputs sound.

The location transmitting module 25 generates the location information of the display device 2, and transmits the location information to the display control apparatus 1. In at least one embodiment, the location information is a GPS information provided by a GPS device. In other embodiments, the location information can be a seating number in a theater for example.

The signal receiving module 26 receives the predetermined media file or part and the control signal, which are transmitted by the display control apparatus 1.

The controlling module 27 obtains a segment of the predetermined media file in response to the control signal, and controls the display device 2 to execute a predetermined operations in relation to the segment. In at least one embodiment, the controlling module 27 controls the display panel 23 to display the obtained region of an image file or the obtained frames of a video file, or controls the loudspeaker 24 to output the passage of music obtained from the audio file.

In one embodiment, the predetermined media file is an image file with a plurality of pixels. Each pixel includes a first sub-pixel, a second sub-pixel, and a third sub pixel. The image is divided into several portions based on a number of the display devices 2 in a group of display devices 2. The controlling module 27 controls the display panel 23 to display a portion of the image in response to the control signal. The controlling module 27 further sets a volume of the loudspeaker 24 based on a gray value of the image displayed in the display panel 23. In at least one embodiment, the first sub-pixel is a red sub-pixel, the second sub-pixel is a green sub-pixel, and the third sub-pixel is a blue sub-pixel.

In other embodiments, the predetermined media file is a video file with a plurality of frames. The controlling module 27 controls the display panel 23 to display the frames of the segment of the video file in response to the received control signal. Thus, each display device 2 display different frames of the video file based on the location information, which can simulate the brightness, colors, and sounds of fireworks.

In yet other embodiments, the predetermined media file is an audio file with a plurality of passages. The controlling module 27 controls the loudspeaker 24 to output a passage of the audio file in response to the control signal. Thus, the display devices 2 can output different parts of the audio file to simulate an echo function.

Figure 4:
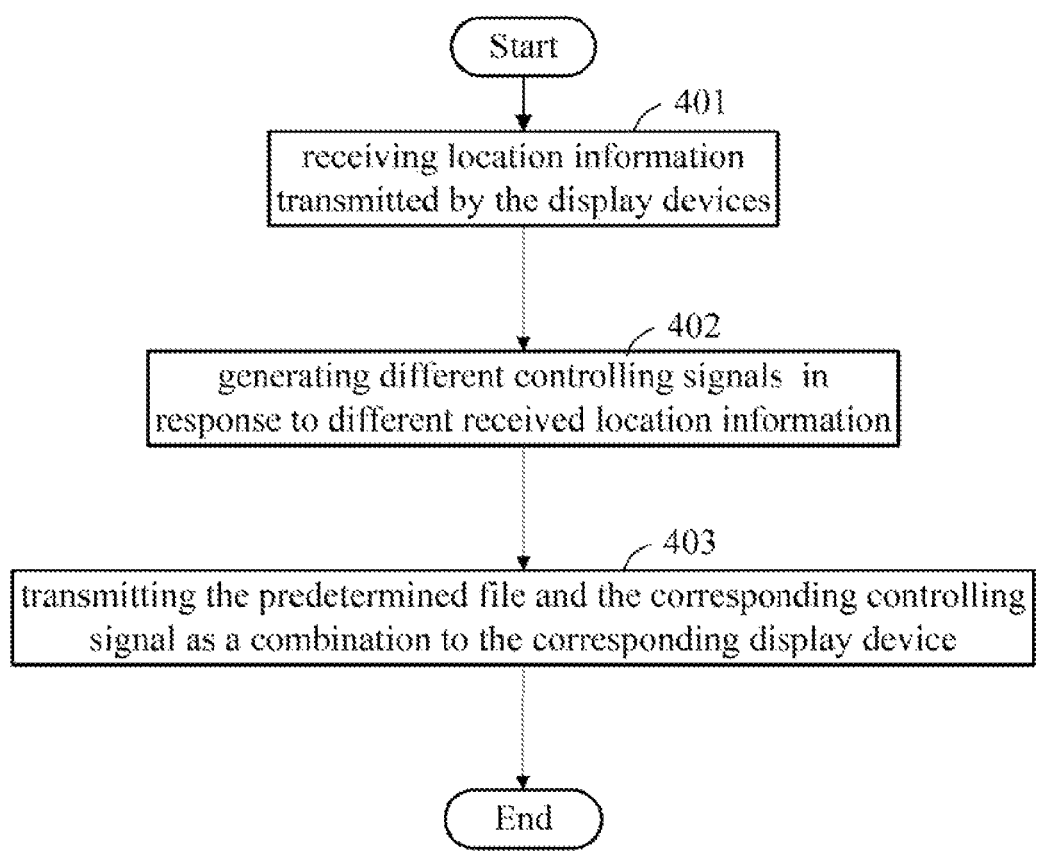
FIG. 4 is a flowchart of a display controlling method.

Referring to FIG. 4, a flowchart is presented in accordance with an example embodiment which is being thus illustrated. The display controlling method 400 is provided by way of example, as there are a variety of ways to carry out the method. The display controlling method 400 described below can be carried out using the configurations illustrated in FIGS. 1 and 3, for example, and various elements of these figures are referenced in explaining the display controlling method 400. Each block shown in FIG. 4 represents one or more processes, methods or subroutines, carried out in the display controlling method 400. Additionally, the illustrated order of blocks is by example only and the order of the blocks can change according to the present disclosure. The display controlling method 400 can begin at block 401.

At block 401, the location receiving module 13 receives location information transmitted by the display devices 2. In at least one embodiment, the location information is a GPS information provided by a GPS device. In other embodiments, the location information can be a theater seating number for example.

At block 402, the signal generating module 14 generates different control signals based on location information of the display device 10. The control signal is related to a segment in a predetermined media file, the segment being different for each location transmitted by the display device 2. In at least one embodiments, the predetermined media file can be an image file, an video file, or an audio file. The segment can be a region of an image file, some frames of the video file, or one passage of music from the audio file. In a first embodiment, the predetermined media file is an image file with a plurality of pixels. The pixel includes a first sub-pixel, a second sub-pixel, and a third sub pixel. The image file is divided into several portions based on a number of the display devices 2. In a second embodiment, the predetermined media file is a video file with a plurality of frames. In a third embodiment, the predetermined media file is an audio file. The first sub-pixel is a red sub-pixel, the second sub-pixel is a green sub-pixel, and the third sub-pixel is a blue sub-pixel.

At block 403, the signal transmitting module 15 transmits the predetermined media file and a control signal as a combination to the display devices 2. Each combination requires the execution of a different operation, the difference in operation being dependent on the location of each display device 2. In the first embodiment, the control signal controls the display panel 23 to display frames of the video file based on the location of the display device 2. The control signal further sets a volume of the loudspeaker 24 based on a gray value of the image displayed in the display panel 23.

In use, the display control apparatus 1 controls each display device 2 to execute an operation based on the locations of the display devices 2, thus a display device 2 in a location which is different to that of another display device 2 will execute a different operation.

While various exemplary and preferred embodiments have been described, the disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A method for controlling multiple display devices, the method comprising:
   receiving location information of a plurality of display devices;
   generating different control signals based on the location information of the display devices, each control signal corresponding to a different segment of a predetermined media file stored in a display control apparatus; and
   transmitting a control signal from amongst the different control signals to each one of the display devices, thereby causing each one of the display devices to display a segment of the predetermined media file not displayed by another display device from amongst the plurality of display devices, the predetermined media file being an image file, each control signals corresponding to a different segment of the image file, the control signal further controlling the corresponding display device to set a volume based on a gray value of the displayed segment of the image file.

2. The method of claim 1, wherein the step of transmitting the control signals to the display devices respectively for controlling each the display devices to display a corresponding segment of the predetermined media file further comprising:
   transmitting the corresponding segment of the predetermined media file to the display device.

3. A display control apparatus communicates with a plurality of display devices; the display control apparatus comprising:
   a processor; and
   a storage device coupled to the processor and configured to store a predetermined media file, the storage device further configured to store one or more programs, which when executed by the processor, cause the processor to:

receive location information of the display devices;

generate different control signals based on the received location information; each of the control signals corresponding to a different segment of the predetermined media file;

transmit a control signal from amongst the different control signals to each one of the display device, thereby causing each one of the display device to display a segment of the predetermined media file not displayed by another display device from amongst the plurality of electronic devices, the predetermined media file being an image file, each control signals corresponding to a segment of the image file, the control signal further controlling the display device to set a volume based on a gray value of the displayed segment of the image file.

4. The display control apparatus of claim 3, wherein the one or more programs further causes the processor to transmit the corresponding segment of the predetermined media file to the display device.

* * * * *